United States Patent

[11] 3,593,414

[72] Inventors Jacobus Pieter Beun; Jules Bos; George Ludwig Walther, all of Emmasingel, Eindhoven, Netherlands

[21] Appl. No. 850,546
[22] Filed Aug. 15, 1969
[45] Patented July 20, 1971
[73] Assignee U.S. Philips Corporation New York, N.Y.
[32] Priority Aug. 22, 1968
[33] Netherlands
[31] 6811950

[54] METHOD OF MANUFACTURING A MAGNETIC HEAD
4 Claims, 4 Drawing Figs.

[52] U.S. Cl. .......... 29/603, 179/100.2 C
[51] Int. Cl. .......... H01f 7/06
[50] Field of Search .......... 29/603; 179/100.2 C; 346/74 MC; 340/174.1 F

[56] References Cited

UNITED STATES PATENTS

| | | | |
|---|---|---|---|
| 3,384,954 | 5/1968 | Bradford et al. .......... | 29/603 |
| 3,402,463 | 9/1968 | Bos et al. .......... | 29/603 |
| 3,474,528 | 10/1969 | Walther et al. .......... | 29/603 |

*Primary Examiner*—John F. Campbell
*Assistant Examiner*—Carl E. Hall
*Attorney*—Frank R. Trifari

ABSTRACT: A very precise method of manufacturing multiple magnetic heads which are to write, read and/or erase extremely narrow (<0.2 mm.) tracks situated beside each other, for example, video heads or "tunnel-erase" heads. For that purpose very shallow (200—300 $\mu$) parallel pairs of channels are sawn in a "sandwich" consisting of two plates of ferrite combined by means of glass which channels are afterwards filled with glass. Deeper (1 mm.) sawcuts are then provided in the conventional manner between the pairs of channels mutually and filled with nonmagnetizable intermediate members.

INVENTORS
JACOBUS P. BEUN
JULES BOS
GEORGE L. WALTHER
BY
Frank R. Trifari
AGENT

PATENTED JUL 20 1971

3,593,414

SHEET 2 OF 2

INVENTORS
JACOBUS P. BEUN
JULES BOS
GEORGE L. WALTHER
BY

AGENT

METHOD OF MANUFACTURING A MAGNETIC HEAD

The invention relates to a method of manufacturing a magnetic head for recording, playing and/or erasing records on a magnetizable carrier, the magnetic circuit(s) of which consist(s) of sintered oxidic ferromagnetic material comprising at least one operative gap filled with a nonmagnetizable material, the starting material being sintered oxidic ferromagnetic material which comprises a gap which is filled with nonmagnetizable material and has a depth at least equal to the height of the ultimately desired operative gap or gaps, and with a distance between the gap-limiting surfaces equal to the ultimately desired gap length(s), mutually parallel saw cuts the direction of which encloses an angle which is unequal to 0° with the gap-limiting surfaces, which intersect the gap and determine the distance between the operative gaps being provided at mutual distances corresponding to the desired gap width(s) and being filled with a nonmagnetizable material.

Such a method of manufacturing a magnetic head is known. This method presented no problems in magnetic heads having gap widths exceeding 0.5 mm. However, for heads which are to write, read and/or erase very narrow magnetic tracks, for example, video heads or "tunnel erase" heads, the known method has great drawbacks. Actually, if in order to obtain a very narrow gap which corresponds to such very narrow tracks, channels are formed at very small distance from each other and with a depth of, for example, 1 mm. or more, a very narrow and comparatively high upright edge remains which both during sawing and in the further processing can easily breakoff or crumble away, the more so since the material to be processed, ferrite, is very brittle. There exist several types of multiple magnetic heads the distances of which between successive operative gaps are considerably larger than the gap widths. This configuration is obtained according to the method already mentioned in that wide channels, in which an intermediate member is provided afterwards, are sawn such that very narrow upright rims of ferrite remain. (Such an intermediate member may consist, for example, of a plate or a packet, which is nonmagnetizable at least in the direction at right angles to the gap length and which serves for the mutual screening of adjacent magnetic circuits. Such an intermediate member may also serve, for example, for the mechanical reinforcement of the ultimate head, in particular there where a support of nonmagnetizable material is necessary on either side of the operative gap or gaps so as to give the record carrier a larger supporting surface during operation.) As a result of the difference in coefficients of expansion of ferrite and the material to be used for the intermediate member, the great danger exists that said narrow rims may get cracked when comparatively large intermediate members are cemented in the channels.

The invention solves the structural difficulties in manufacturing a magnetic head as described above, for which purpose the method according to the invention is characterized in that the saw cuts in the magnetizable material are provided by means of a first sawing operation, wherein pairs of channels are sawn at least up to the lower edge of the smallest gap-limiting surface present in the finished head, in such manner that the gap width(s) is (are) determined by the distance(s) of the channels of one pair and in such manner that the distance between two operative gaps is determined by the distance of the innermost channels of two adjacent pairs of channels, that between the innermost channels of each set of adjacent pairs of channels the sintered oxidic ferromagnetic material is then removed by means of a second sawing operation up to a depth exceeding the depth of the pairs of channels formed by means of the first sawing operation which are filled with a nonmagnetizable material the mechanical properties of which are as much as possible the same as those of the sintered oxidic ferromagnetic material, and that the saw cuts obtained by means of the second sawing operation are filled with an intermediate member such that the upper face of said member is at least flush with the operative face of the ultimate head, after which, in known manner, the operative face is provided, the parts of sintered oxidic ferromagnetic material which comprise the operative gaps and which in the finished head form the pole shoe units of adjacent circuits are separated from each other magnetically by providing one or more saw cuts, the wire turns necessary for the head being then provided and the magnetic circuits being finally closed.

The great advantage of the method according to the invention is that since *first* a shallow channel (for example, 200 to 300 $\mu$) is sawn by means of a very fine sawing operation on either side of each gap to be manufactured viewed in the relative direction of movement with the respect to the magnetizable carrier, which channels are afterwards filled with a nonmagnetizable material, magnetic heads can be manufactured the magnetic reluctance of which in the proximity of the operative gap is very much larger than anywhere else in the circuit. In consequence the height of the upright rims of sintered oxidic ferromagnetic material formed as a result of said fine sawing operation and containing the operative gaps is very small so that the danger of breaking or crumbling away both during sawing and during further processing is small as compared with the danger which exists when the conventional method of manufacturing heads having a very small gap width is used in which immediately deep (for example, 1 mm.) channels which are to be filled with intermediate members are sawn between the gaps to be manufactured.

Since according to the invention deeper saw cuts for the intermediate members, are provided between the shallow pairs of channels by means of a second sawing operation, channels and upright rims are obtained which are considerably narrower and considerably wider, respectively, than those which are obtained by means of the conventional method, while nevertheless the required distance of the operative gaps is maintained. A further advantage of the method according to the invention is that the above-mentioned danger of cracking of the upright edges of ferrite is considerably reduced not only during sawing but also during cementing the intermediate members.

Although it is possible to provide nonmagnetizable filling material in the pairs of channels (for example, glass, which is first heated to the melting temperature and then cooled) before the sawing of the deeper channels and the cementing of the intermediate members therein, the method according to the invention provides an additional advantage when the deeper channels are sawn, the intermediate members are then laid in them, so that they project above the bottom of the pairs of shallow channels, glass is provided in said pairs of channels and then melted. The melted glass will find its way between the walls of the intermediate members and the deep channels. When the assembly is then cooled, the intermediate members will be cemented in the channels and the glass will be provided in the pairs of channels.

The method according to the invention is of particular advantage for series production. Since it is possible to saw one pair of channels in one operation by means of a double saw (that is to say with two parallel sawing tools) so that the distance between the channels is fixed, the gap width is reproducible. In this manner it is also possible, for example, to use a triple saw in manufacturing tunnel-erase heads.

Pole shoe units for single and/or multiple heads are obtained by sawing the body comprising the operative gaps, after having ground it down, along planes which are situated in the intermediate members preferably at right angles to the direction of the gap width. In the pole shoe unit of a multiple head, the parts of adjacent circuits comprising the operative gaps may then be separated magnetically from each other by sawing the unit along a plane which touches or intersects the intermediate members and which is preferably parallel to the operative face.

However, it is alternatively possible to separate the parts of adjacent circuits magnetically from each other by providing saw cuts from below in the assembly obtained which saw cuts extend in the intermediate members.

Finally the required wire turns may be provided and the magnetic circuits may be closed by means of magnetizable closing yokes or closing plates.

Although as a method of obtaining the pairs of channels in the above a sawing operation has been mentioned, it will be obvious that other methods, for example, polishing may alternatively be used.

An advantage of the method described over many of the so far known methods is that the size precision with respect to the gap width is provided in an initial stage of the total manufacture, which provides the advantage that a workpiece which does not correspond to the tolerances as regards the gap width, can be withdrawn from the production process before it has undergone the time-consuming subsequent operations.

A preferred embodiment of the method according to the invention is characterized in that pairs of channels are provided by means of a first sawing operation at such a mutual distance between the channels of one pair that in the finished head the operative gap has a width smaller than 0.2 mm. In the present video heads gap widths narrower than 0.2 mm. are conventional. During the actual manufacturing of heads with such small gap widths the possibility of breaking of the upright rims is large when one of the so far known methods is used.

A further preferred embodiment of the method according to the invention is characterized in that glass is used as a filling material for the pairs of channels. An advantage of glass is that it can be chosen to be so that in the relevant temperature range, the mechanical properties are substantially equal to those of the ferrite used and that it can be provided by heating it to the melting temperature and then cooling it, while a type of glass may be chosen which has a melting temperature lower than that of the gap-filling material already present. Moreover, it is simple by means of the method according to the invention to provide the glass on either side of such a very narrow gap, and hence of a very narrow upright edge.

A further preferred embodiment of the method according to the invention is characterized in that the glass is provided in the pairs of channels and the intermediate members are provided in the saw cuts in one cementing process. One cementing process has the advantage that it provides a time saving which is of great importance for series production. Moreover, the coherence of the construction is better maintained when one cementing process is used than when two successive cementing processes are carried out.

The invention also relates to a magnetic head manufactured according to one or more of the above-mentioned methods.

In order that the invention may be readily carried into effect, one embodiment of the method according to the invention will now be described in greater detail, by way of example, with reference to the accompanying drawings, in which FIG. 1 is an isometric side-elevation of a pole shoe unit of a multiple magnetic head according to the invention in a stage of manufacturing succeeding the provision by means of a first sawing operation of shallow pairs of channels determining the gap width.

In the Figures, corresponding components have been given the same reference numerals.

Figure 1:
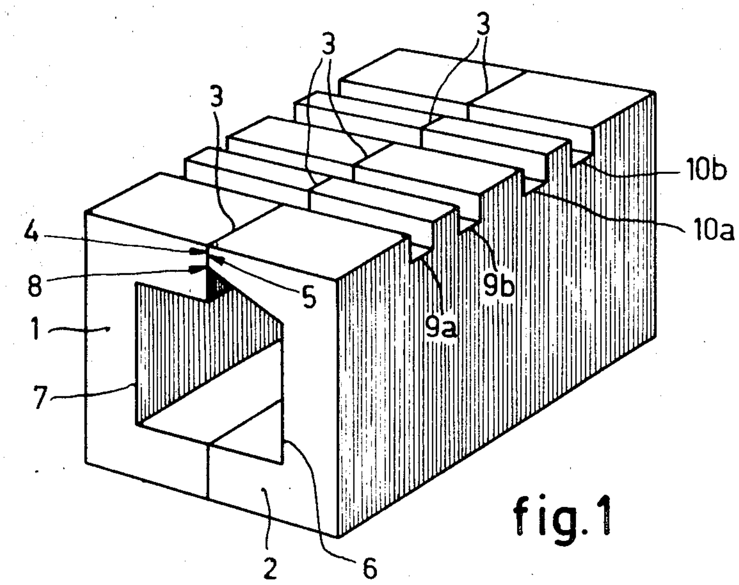

In FIG. 1, blocks 1 and 2 of sintered oxidic ferromagnetic material are combined by means of nonmagnetizable material 3 having a thickness equal to the length of the gap in the finished head. (It is also possible to start from one block sintered oxidic ferromagnetic material which comprises a gap filled with nonmagnetizable material.) In the embodiment shown, 4 and 5 denote the surfaces which in the finished head form the gap-limiting surfaces. The two surfaces 4 and 5 comprise profiles 6 and 7, respectively, while the upper edge 8 of the profile 6 forms the reference line for determining the ultimately desired gap height.

In the body obtained by combining the blocks 1 and 2, shallow (200 to 300 $\mu$) pairs of channels (9*a*, 9*b*) and (10*a*, 10*b*) are provided by means of a very fine first sawing operation, said channels preferably being slightly deeper than the reference line 8 for the gap height. It is possible to saw pairs of channels in one operation by means of the above-mentioned "double saw," so that the distance between the channels of one pair, which determines the gap width in the finished head, is reproducible. Very small gap widths namely smaller than 0.2 mm., can be obtained by means of a method of precision sawing, in which a "saw" is used in the form of a disc which cuts throughout its circumference and is suspended and driven in a wobble-free manner, crumbling away of the ferrite being restricted to maximally 5 $\mu$.

Figure 2:
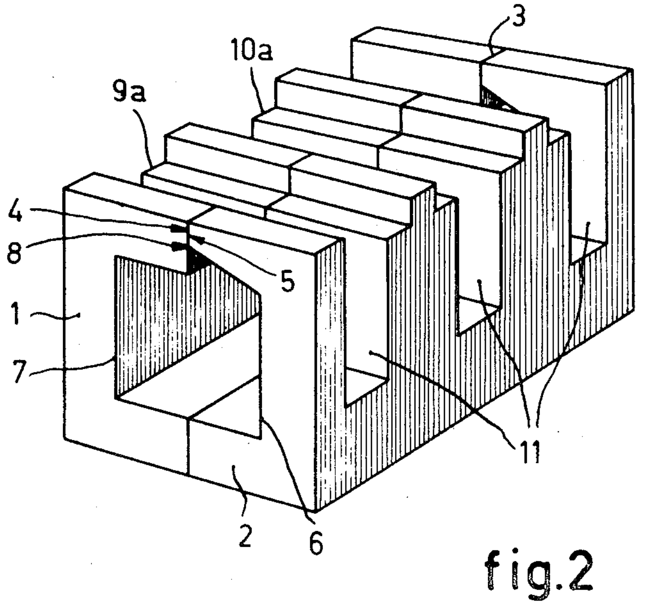
FIG. 2 shows the same pole shoe unit in a stage of manufacturing succeeding the provision of separate deep channels for the intermediate members by means of a second sawing operation.

In FIG. 2 reference numeral 11 denotes the saw cuts which are provided by means of a second sawing operation which may be coarser and is applied each time between adjacent pairs of channels 9 and 10 which saw cuts extend below the upper edge 8 of the profile 6.

Figure 3:
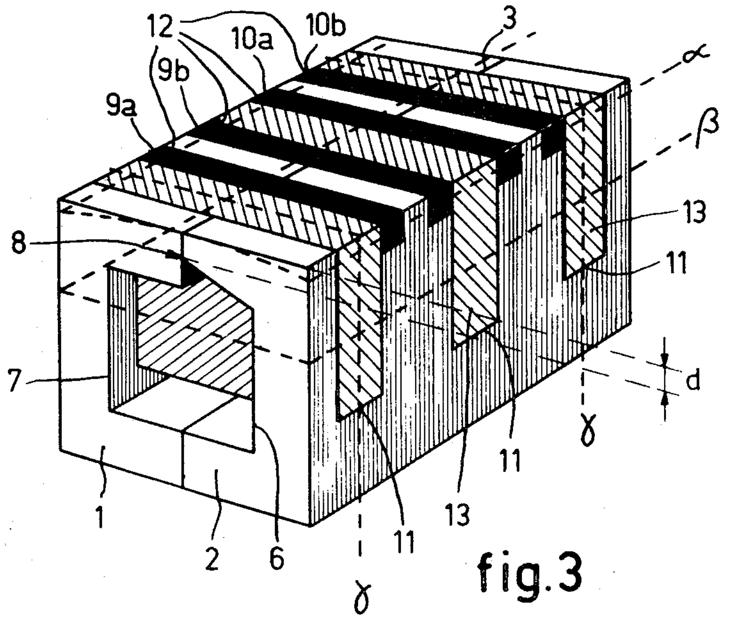
FIG. 3 shows the same pole shoe unit in a stage of manufacturing succeeding the provision of nonmagnetizable material in the pairs of channels and of intermediate members in the individual channels.
Figure 4:
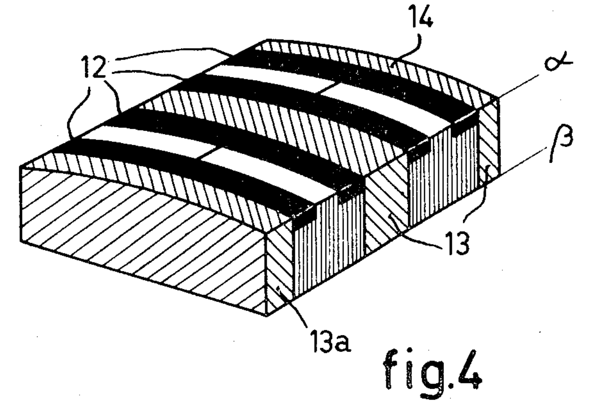
FIG. 4 is a pole shoe unit of a multiple magnetic head after the gap-containing part has been separated from the lower part of the body and the operative face has been provided.

Reference numerals 12 in FIG. 3 denote the nonmagnetizable filling material which is provided in the pairs of channels (9*a*, 9*b*, 10*a*, 10*b*). The mechanical properties of this material 12 are as much as possible equal to those of the ferrite used. In the channels 11 nonmagnetizable material 13 is provided. This material 13 is to fill the channels 11 to such a height that in the finished pole shoe unit as shown in FIG. 4, it also forms the operative face, that is to say that it reaches up to or projects above the operative face to be formed ultimately. The filling material 12 and the bodies 13 are cemented separately or simultaneously in which in the latter case glass may be used as the filling material 12 which also serves as a cement for the bodies 13.

FIG. 4 shows a finished multiple pole shoe unit manufactured from a part of the structure shown in FIG. 3, after the operative face 14 has been given the desired shape by grinding down and the desired distance *d* (gap height) up to the reference line 8 is reached and after the upper part of the structure has been separated from the lower part along the plane $\beta$. As a closing member may be used for each individual circuit, for example, a U-shaped circuit part (which circuit may be united previously to form one assembly by means of nonmagnetizable material) which can comprise the wire turns required for the head.

The above-described methods may also be of advantage for manufacturing a pole shoe unit of a single magnetic head. Particularly there where a support 13*a* etc. of nonmagnetizable material is necessary on either side of the magnetic circuit parts so as to give the record carrier a larger supporting surface during operation.

What we claim is:

1. A method of manufacturing a magnetic head for recording, playing back erasing record on a magnetizable carrier, the magnetizable circuit of which consists of sintered oxidic ferromagnetic material comprising at least one operative gap filled with nonmagnetizable material, the starting material being sintered oxidic ferromagnetic material which comprises a gap which is filled with a nonmagnetizable material and has a depth of at least equal to the height of the ultimately desired operative gap or gaps, and with a distance between the gap-limiting surfaces equal to the ultimately desired gap length, mutually parallel saw cuts, the direction of which encloses an angle which is unequal to 0° with the gap-limiting surfaces, which intersect the gap and determine the distance between the operative gaps, being provided at mutual distances corresponding to the desired gap width and being filled with a nonmagnetizable material, characterized in that said saw cuts in the magnetizable material are provided by means of a first sawing operation, wherein pairs of channels are sawn at least up to the lower edge of the smallest gap-limiting surface present in the finished head, in such manner that the gap width is determined by the distance between the channels of one pair and in such manner that the distance between two operative gaps is determined by the distance between the innermost channels of two adjacent pairs of channels, that subsequently between the innermost channels of each set of adjacent pairs of channels the sintered oxidic ferromagnetic material is removed by means of a second sawing operation up to a depth exceeding the depth of the pairs of channels formed by means of the first sawing operation which pairs of channels are filled with nonmagnetizable material the mechanical properties of which are substantially the same as those of the sintered oxidic ferromagnetic material, and that the saw cuts obtained by means of the second sawing operation are filled with a member such that the upper face of said member is at least flush with the operative face of the ultimate head, after which, the operative face is provided, the parts of sintered oxidic ferromagnetic material comprising the operative gaps, and which in the finished head form the pole shoe units of two adjacent circuits are separated magnetically from each other by providing one or more saw cuts, the wire turns required for the head being provided and the magnetic circuits being finally closed.

2. A method as claimed in claim 1, characterized in that pairs of channels are provided by means of a first sawing operation at such a mutual distance between the channels of one pair that the operative gap in the finished head has a width smaller than 0.2 mm.

3. A method as claimed in claim 1, characterized in that the pairs of channels formed by means of the first sawing operation are filled with glass which has a melting point lower than that of the gap-filling material.

4. A method as claimed in claim 3, characterized in that the glass is provided in the pairs of channels formed by means of the first sawing operation and the intermediate members are provided in the saw cuts in one cementing process.